(12) United States Patent
Benkowski et al.

(10) Patent No.: US 9,048,758 B2
(45) Date of Patent: Jun. 2, 2015

(54) PROVISION OF A NORMAL FORCE TO ELECTROMECHANICAL MOTOR

(75) Inventors: Per Benkowski, Uppsala (SE); Stefan Johansson, Uppsala (SE)

(73) Assignee: PIEZOMOTOR UPPSALA AB, Uppsala (SE)

(*) Notice: Subject to any disclaimer, the term of this patent is extended or adjusted under 35 U.S.C. 154(b) by 533 days.

(21) Appl. No.: 13/505,313

(22) PCT Filed: Nov. 11, 2009

(86) PCT No.: PCT/SE2009/051288
§ 371 (c)(1),
(2), (4) Date: May 1, 2012

(87) PCT Pub. No.: WO2011/059369
PCT Pub. Date: May 19, 2011

(65) Prior Publication Data
US 2012/0212103 A1    Aug. 23, 2012

(51) Int. Cl.
H02N 2/00 (2006.01)
H01L 41/09 (2006.01)
H02N 2/02 (2006.01)

(52) U.S. Cl.
CPC ............. H02N 2/021 (2013.01); H02N 2/006 (2013.01)

(58) Field of Classification Search
USPC ............ 310/323.01, 323.02, 323.08, 323.09, 310/323.17, 328
See application file for complete search history.

(56) References Cited

U.S. PATENT DOCUMENTS

| 5,982,075 | A | 11/1999 | Hayasaka |
| 6,392,328 | B1 * | 5/2002 | Ashizawa ............... 310/323.01 |
| 6,798,117 | B2 | 9/2004 | Johansson et al. |
| 6,979,934 | B1 | 12/2005 | Wischnewskiy |
| 7,084,550 | B2 * | 8/2006 | Sasaki et al. ............ 310/323.17 |
| 7,161,278 | B2 | 1/2007 | Johansson |
| 7,355,325 | B2 | 4/2008 | Johansson et al. |
| 8,314,533 | B2 * | 11/2012 | Higashionji et al. ...... 310/323.09 |
| 8,436,513 | B2 * | 5/2013 | Mukae et al. ............ 310/323.02 |

FOREIGN PATENT DOCUMENTS

DE 10 2008 026 770 A1 12/2009

OTHER PUBLICATIONS

International Search Report, dated Jun. 30, 2010, from corresponding PCT application.

* cited by examiner

*Primary Examiner* — Thomas Dougherty
(74) *Attorney, Agent, or Firm* — Young & Thompson

(57) ABSTRACT

An electromechanical motor assembly includes a stator, a body to be moved and a stator support. The stator has a plurality of electromechanical actuators for moving the body by repetition of steps ensuring that at least one of the electromechanical actuators is in non-sliding contact with the body at every time. The assembly further includes a force applying arrangement for supplying a normal force (N) between the stator and the stator support by at least one spring arrangement. The spring arrangement has a spring constant in the direction (Z) normal to the surface of the body that is lower than 5% of the ratio between the normal force and the average height uncertainty of the surface of the body. The force applying arrangement includes a lateral fixing plate attached between the stator and the support parallel to the main motion direction (X) and juxtaposed to the surface of the body.

20 Claims, 6 Drawing Sheets

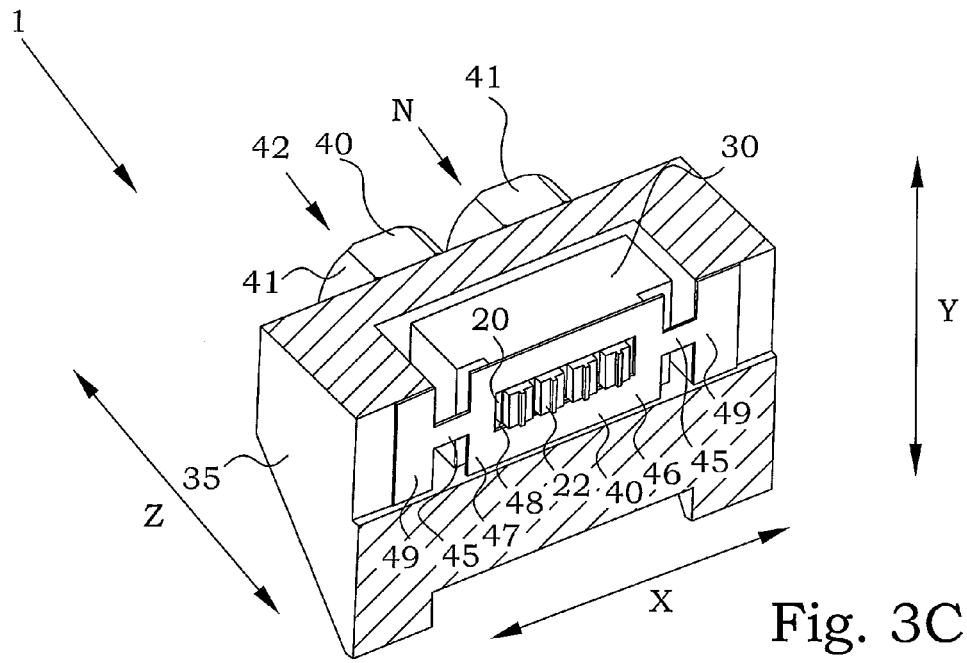
Fig. 3C
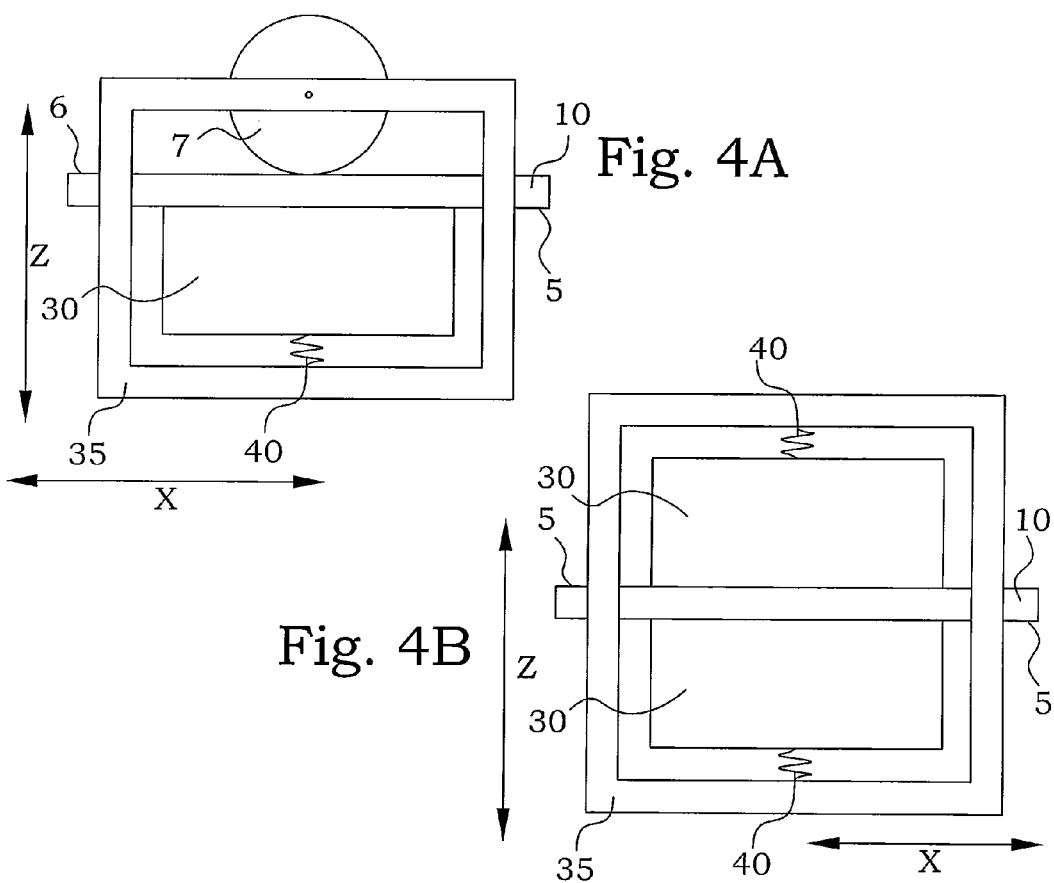
Fig. 4A
Fig. 4B

PROVISION OF A NORMAL FORCE TO ELECTROMECHANICAL MOTOR

TECHNICAL FIELD

The present invention relates in general to electromechanical micromotors and in particular to electromechanical micromotors utilizing repetitive operation of a plurality of electromechanically active actuator elements.

BACKGROUND

During many years, micromotors based on electromechanically active materials, such as e.g. piezoelectric materials, have been used for many various applications. In particular in different consumer products, where small volume, low weight, low power consumption and inexpensive arrangements are appreciated, such motors have been used. Such motors are often characterized by a relatively high speed, silent movement, low power consumption, high position accuracy etc. In order to reach very high positioning accuracies, different motion mechanisms such as "walking" mechanisms, stick-slip mechanisms, "inertial" positioning, peristaltic mechanisms or stepping mechanisms have typically been used. In such mechanisms, the motion is based on repetitive operation of a plurality of electromechanically active actuator elements. Walking and stepping mechanisms are typically the most accurate.

Very successful examples of such electromechanical motors are disclosed in the U.S. Pat. No. 6,798,117 and U.S. Pat. No. 7,355,325. Two sets of drive elements are alternatingly contacting an object to be moved. The drive elements are connected to a common back and further attached to a housing of the motor. In order to allow for transferring a motion to the object, the drive elements have to be connected to the housing in such a way that the housing acts as a counterhold for the driving forces in the driving direction. Furthermore, the drive elements have to be hold against the surface of the object to be driven by a certain normal force in order to be able to drive the object. In U.S. Pat. No. 6,798,117, the drive elements are firmly attached to the housing to provide the "stiffness" in the driving direction. The normal force is provided by a spring means acting against a pair of rollers, in turn pushing the object towards the actuators or drive elements.

In order to achieve a well-defined operation, the accuracy of the surfaces has to be very good. Differences in distance and angle between the actuators and the driven object caused by alignment errors, including mounting errors, non-planarity, wear, deformation etc., result in uncertainties of the exact driving conditions. This may influence speed, force and positioning accuracy. The motor stator therefore has to be able to adapt to the various relative alignment errors between the driven object and the support of the stator.

A general problem with prior art electromechanical motors is thus that they are relatively sensitive to the support of the stator.

SUMMARY

An object of the present invention is thus to provide for an electromechanical motor utilizing repetitive operation of a plurality of electromechanically active actuator elements that is more robust concerning surface and actuator height uncertainties.

The above object is achieved by an electromechanical motor assembly according to the enclosed independent claim. Preferred embodiments are specified in the enclosed dependent claims. In general words, an electromechanical motor assembly comprises a stator, a body to be moved relative the stator in a main motion direction and a stator support. The stator has a plurality of electromechanical actuators. Each electromechanical actuator has a contact portion for interaction with a surface of the body to be moved. The plurality of electromechanical actuators are arranged to move the body to be moved by repetition of steps of the electromechanical actuator. The plurality of electromechanical actuators are arranged to ensure that at least one of the contact portions is in physical non-sliding contact with the body to be moved at every time. The electromechanical motor assembly further comprises a force applying arrangement for supplying a normal force between the stator and the stator support. The force applying arrangement comprises at least one spring arrangement arranged for providing a force between the stator and the stator support in a direction normal to the surface of the body to be moved. The force applying arrangement further comprises a lateral fixing plate attached between the stator and the stator support parallel to the main motion direction and juxtaposed to, but not in physical contact with, the surface of the body to be moved. The spring arrangement has a low spring constant in the direction normal to the surface of the body to be moved. The spring constant is lower than 5% of the ratio between the normal force and the average height uncertainty of the surface of the body to be moved.

One advantage with the present invention is that the electromechanical motor assembly typically is less sensitive to surface and actuator alignment inaccuracies for achieving an accurate operation. Further advantages are described in connection with the different embodiments of the detailed description further below.

BRIEF DESCRIPTION OF THE DRAWINGS

The invention, together with further objects and advantages thereof, may best be understood by making reference to the following description taken together with the accompanying drawings, in which:

FIGS. 3A-C are views of an embodiment of an electromechanical motor assembly according to the present invention;

FIGS. 4A-B are schematic drawings of different embodiments for providing a counterhold for normal forces;

DETAILED DESCRIPTION

Throughout the drawings, the same reference numbers are used for similar or corresponding elements.

Figure 1:
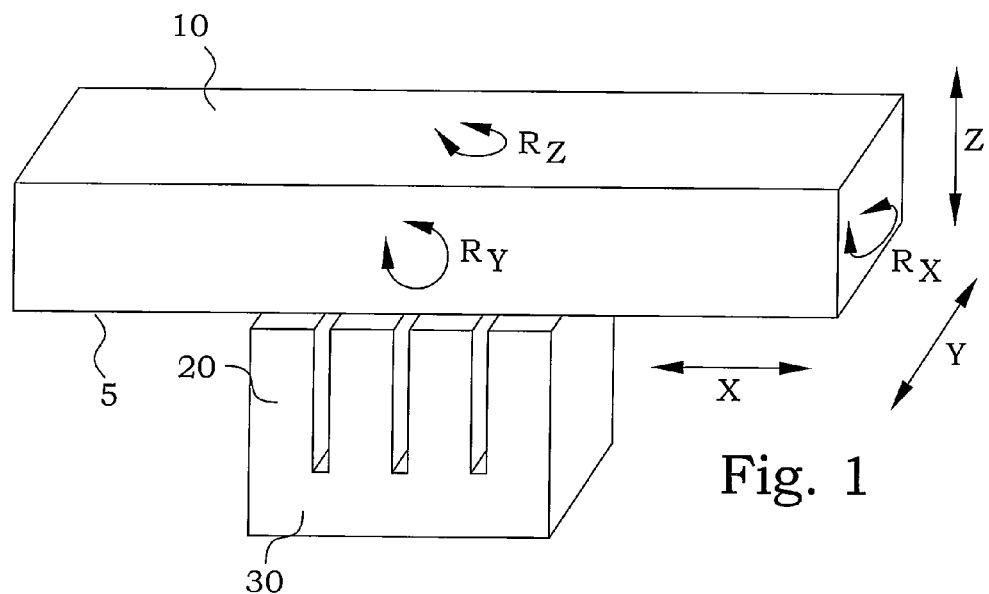
FIG. 1 is an illustration of directions of translations and rotations.

There are a number of different possible relative motions between a stator 30 having a plurality of electromechanical actuators 20 and a body 10 to be moved. FIG. 1 illustrates the different possible movements, in order to facilitate the later discussion. A linear displacement or translation along the intended main motion direction is denoted as a translation in the X direction. A linear displacement or translation in the direction perpendicular to the surface 5 of the body 10 to be moved against which the actuators 20 act is denoted as a translation in the Z direction. A linear displacement or translation perpendicular to both the X and the Z directions is denoted as a translation in the Y direction.

Similarly, relative rotations between the electromechanical actuators 20 and the body 10 to be moved can also be defined. For simplicity, these relative rotations are defined by the axis around which the rotation takes place. A relative rotation around an axis in the X direction is denoted $R_X$, i.e. a rotation along the main motion direction. This is often referred to as a roll. A relative rotation around an axis in the Y direction is denoted $R_Y$. This is often referred to as a pitch. A relative rotation around an axis in the Z direction is denoted $R_Z$. This is often referred to as yaw.

In order to tolerate some inaccuracies in e.g. the surface smoothness of the body 10, the stator 30 has to provide a certain degree of motional freedom with respect to any stator support. In many applications, the translation in the Y direction, as well as the rotation in the $R_Z$ direction, are either of less importance for the driving accuracy and/or are easily controlled by different bearing arrangements. The focus will therefore at first be on the two translations X and Z and the two rotations $R_Y$ and $R_X$.

Figure 2A:
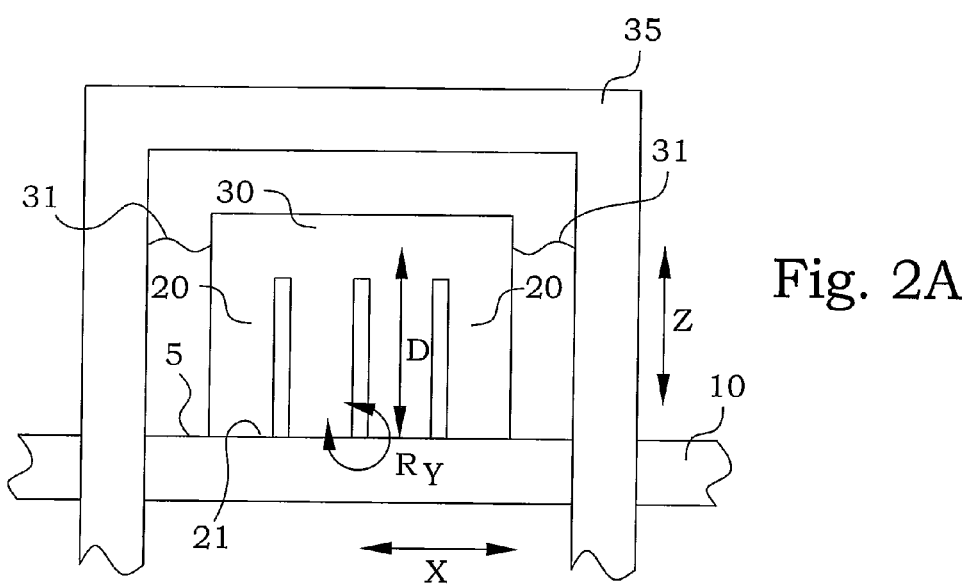
FIGS. 2A-E are illustrations of force, translation and rotation conditions in a motor assembly.

With reference to FIG. 2A, when the actuators 20 are going to exert a force onto the body 10, there has to be a counteracting force between the stator 30 and a stator support 35 or "motor housing". In many prior art arrangements, there has been a stiff or essentially stiff mounting of the stator 30 to the stator support 35. However, in order to allow for compensating for inaccuracies in actuator heights and/or uneven surfaces of the body 10, it is advantageous to allow the stator 30 to be at least somewhat movable with respect to the stator support 35. However, as noticed above, some physical connection has always to exist. This connection is illustrated in FIG. 2A as elastic connections 31. In order to allow for necessary rotations in the $R_Y$ and $R_X$ directions and translations in the Z direction, these elastic connections 31 should be "weak" in the Z direction. At the contrary, in order to secure high position accuracy in the X direction, the elastic connections 31 have to be relatively "stiff" in the X direction.

However, if the elastic connections 31 are provided at the upper part of the stator 30 as illustrated, any force exerted by the stator support 35 on the stator 30 via the elastic connections 31, will also give rise to a torque with respect to the contact plane 21 between the actuators 20 and the body 10, with a torque arm denoted by D. In practice this contact plane coincides with the interaction surface 5 of the body. This is due to the fact that the actuators 20 interact with the body 10, i.e. exert the driving force on the body 10, at that contact plane 21. If relatively large forces are used, the torque may be significant, which in turn causes a pitch in the $R_Y$ direction.

Figure 2B:
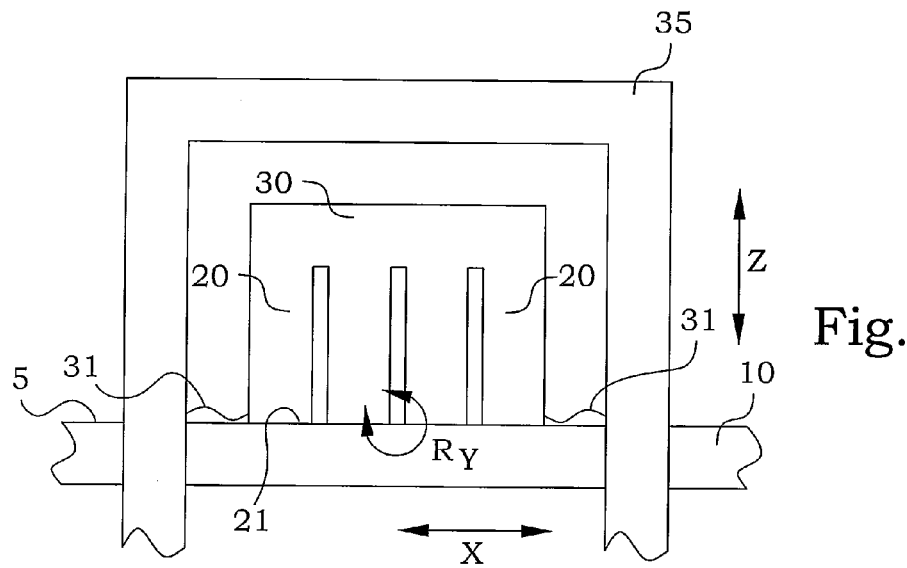

The arrangement in FIG. 2B provides a better situation. Here, the elastic connections 31 prohibiting the movement in the X direction are connected to the stator 30 at a position close to the contact plane 21. Any torque acting at the stator 30 will now be much less, since the torque arm is reduced to a fraction of the one of FIG. 2A.

From this one can conclude that any arrangement for restricting the X direction movement of the stator 20 relative to the stator support 35 should be provided juxtaposed to, but not in physical contact with, the surface 5 of the body 10 to be moved.

In many prior art arrangements, the provision of the normal force and the motion restriction in the X direction are made by one and the same members. However, if the members restricting the X motion of the stator 30 are to provided close to the surface 5 of the body, the space in this area is often too limited to be able to accommodate members providing the normal force, at least such members according to prior art ideas.

Figure 2C:
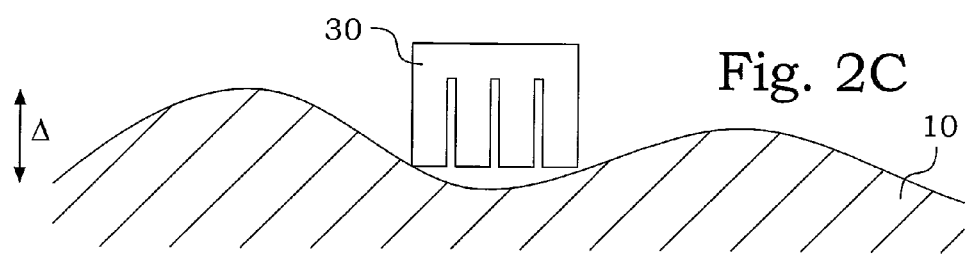
Figure 2D:
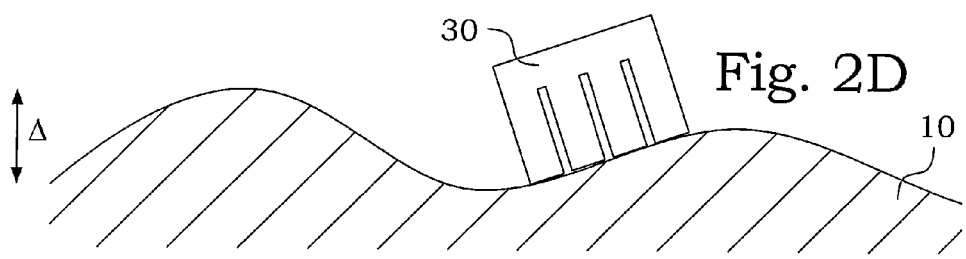
Figure 2E:
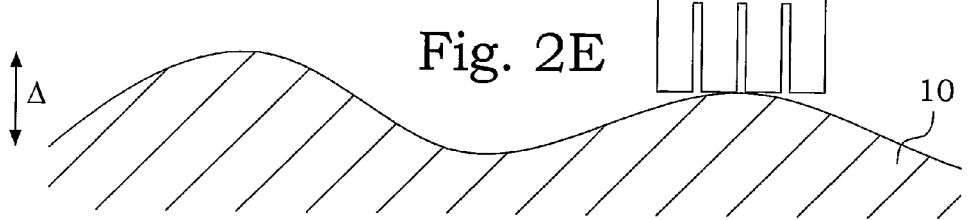

In contrary to the request for high stiffness in the X direction, the application of a normal force in the Z direction should preferably also allow a relatively high degree of motion freedom in that direction. This is typically also valid for the rotation in the $R_Y$ and $R_X$ directions. The basic ideas behind this may be understood by reference to FIGS. 2C-E. A body with a non-perfect flatness of its interaction surface 10 is to be driven by actuators 20 of a stator 30. FIGS. 2C-E illustrate three different relative positions in the X direction. Note that the non-flatness is extremely exaggerated in the figures in order to visualize the ideas. The average height uncertainty of the surface of the body to be moved is denoted as Δ and is defined as the linear alignment error of the body relative the motor housing along the z-axis. There are also corresponding angular alignment errors in $R_Y$ and $R_X$ directions. In order to have a relatively well characterized operation, the operation conditions in all these three positions have to be almost identical despite the differing relative orientation and position of the actuators 20 and surface 5. The stator 30 therefore has to be allowed to move in the Z direction without considerably changing the applied normal force. Likewise, the stator 30 must be allowed to rotate in the $R_Y$ and/or $R_X$ directions in order to compensate for inclining/declining surfaces 5. In other words, the stiffness of the connection between stator and stator support in the Z direction has to be low, and preferably allow at least a minor rotation in the $R_Y$ and/or $R_X$ directions. This allows a good alignment to the driven body and gives an ability to accept deviations in e.g. assembly without affecting the preload forces.

Figure 3A:
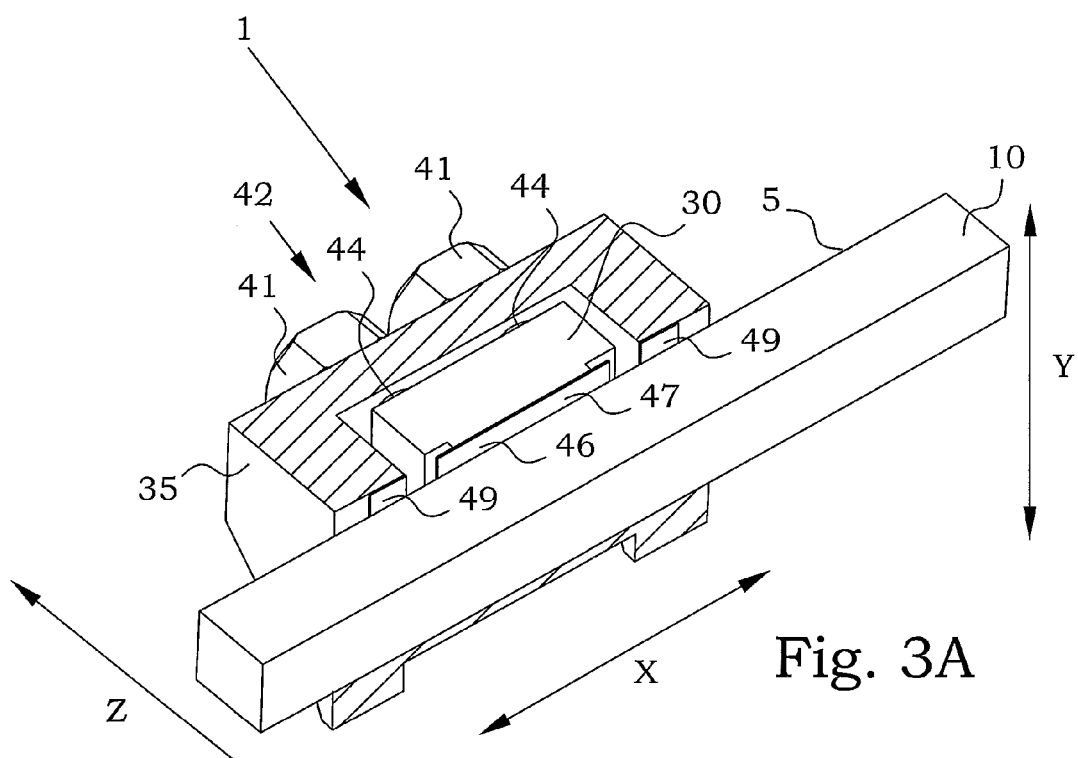
Figure 3B:
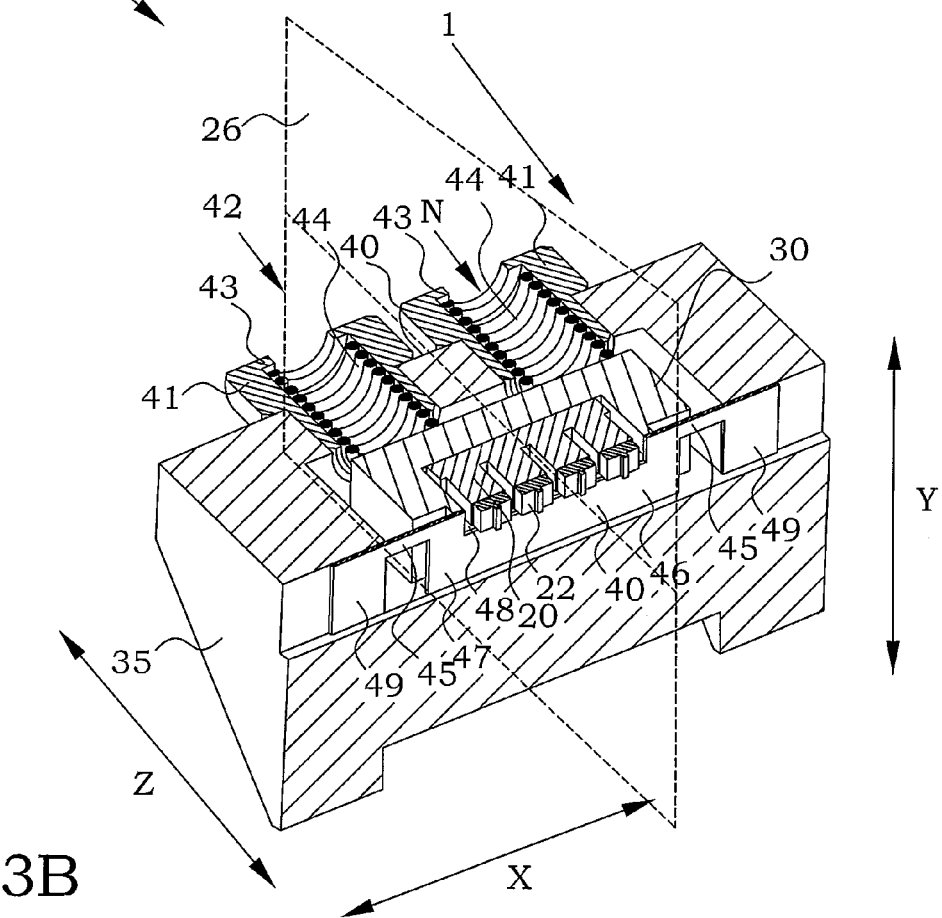

FIG. 3A shows a cross-sectional view of an embodiment of an electromechanical motor 1 assembly according to the present invention. The cross-section is taken in a plane parallel to the X and Z directions, offset in the Y from the center of the assembly. FIG. 3B shows the same embodiment in a cross-sectional view with the moved removed, with the cross-section taken in a plane parallel to the X and Z directions in through the center of the assembly in the Y direction. The cross-section is taken in a plane parallel to the X and Z directions, offset in the Y from the center of the assembly. FIG. 3C shows a similar view as in FIG. 3A, but with the body removed. The references in the following description will refer to all these figures, depending on which feature that is discussed. A stator 30 has a plurality of electromechanical actuators 20. Each electromechanical actuator 20 has a contact portion 22 for interaction with a surface 5 of the body 10 to be moved. The body 10 to be moved is moved relative to the stator 30 in a main motion direction X. The plurality of electromechanical actuators 20 are arranged to move the body 10 to be moved by repetition of steps of the electromechanical actuator 20. The plurality of electromechanical actuators 20 are also arranged to ensure that at least one of the contact portions 22 is in physical non-sliding contact with the body 10 to be moved at every time. The electromechanical motor 1 assembly further comprises a stator support 35.

In the present embodiment, four electromechanical actuators are present. However, any plurality of electromechanical actuators can be used. In a typical arrangement, the electromechanical actuators are operatively connected in at least two groups of electromechanical actuators. Each group of electromechanical actuators moves together in corresponding motion patterns. The motion of the groups differs from each other, typically by a phase difference. However, also completely different motion sequences may be utilized. In the typical walking or stepping mechanism, one group of electromechanical actuators are at each instant in contact with the body, preferably transferring a motion thereto, while another group of electromechanical actuators are released from the body and restored into a starting position for a new cycle.

The electromechanical actuators of this particular embodiment are formed as essentially rectangular blocks of Piezoceramic material. The blocks are attached with one end to a common backing, having the contact portion 22 attached to the other end. The blocks are in this embodiment arranged as bimorphs, having two separately excitable parts positioned after each other in the main motion direction X. By applying suitable voltages to the different parts, the block can be caused to bend in the X direction as well as presenting a length difference in the Z direction. By utilizing such shape changes, interaction with and moving of the body can be achieved. The separate block are movable mechanically independent of each other, i.e. essentially no forces are exchanged between the block, except via the common backing or the body to be moved. However, the volumes between the block may optionally be filled with easily deformable material that do not influence the shape changes of the blocks.

Also other types of motion mechanisms can be utilized together with the force application ideas of the present invention, as will be described further below.

A force applying arrangement, collectively denoted by 40, is provided for supplying a normal force N, i.e. in a direction perpendicular to the surface 5 of the body 10—the Z direction, between the stator 30 and the stator support 35. The force applying arrangement 40 comprising at least one spring arrangement 42 arranged for providing a force between the stator 30 and the stator support 35 in the Z direction. In this embodiment, the spring arrangement 42 comprises two coil springs 44. In alternative embodiments, the spring arrangement 42 may be based on other types of resilient arrangements, such as leaves, solid elastomers, liquids (hydraulic), gases (pneumatic) or electromagnetic forces.

The force applying arrangement 40 further comprises a lateral fixing plate 46 attached between the stator 30 and the stator support 35 parallel to the main motion direction X and juxtaposed to, but not in physical contact with, the surface 5 of the body 10 to be moved. The spring arrangement 42 has a low spring constant in the direction Z normal to the surface 5 of said body 10 to be moved. This low spring constant is lower than 5% of the ratio between the normal force N and the average height uncertainty of the surface 5 of the body 10 to be moved. This makes it possible to compensate for surface flatness uncertainties without introducing too large changes in the general operating conditions. Experience has shown that the motor operation in most applications accepts a force variation of 5%. However, it is of course even better if the force variation can be kept even smaller. Therefore, more preferably, in particular for applications having very high demands on reproducibility, the spring constant is lower than 1% of the ratio between the normal force N and the average height uncertainty of said surface 5 of the body 10 to be moved.

In the present embodiment, spring arrangement 42 comprises two coil springs 44 applied between the stator 30 and said stator support 35 on each side, in the X direction, of the stator 30 centre. Typically, this centre coincides with a symmetry plane 26 perpendicular to the main motion direction X and passing through a symmetry point of said stator 30. Such an arrangement of the coil springs 44 provides for that the normal force N is provided symmetrically on the stator 30. In other words, the normal force N will not act to tilt the stator 30 in the $R_Y$ direction. In an alternative embodiment, a single spring could be provided in the same plane as the centre of the stator 30.

The coil springs 44 of the present invention are applied between the stator support 35 and the back side of the stator 30. The coil springs 44 are in this embodiment held by a respective hollow bolt 41, screwed into threaded connection with a main body of the stator support 35. The coil spring 44 is in one end supported by a flange 43 at the head of the hollow bolt 41. Since the coils spring preferably has a low spring constant, the coil spring 44 has to be compressed considerably in order to give a sufficient normal force N. The uncompressed spring is therefore very long compared to the spring length when mounted. In order to facilitate mounting, the bolt head is therefore in this embodiment provided with a hole in the longitudinal direction, through which a guiding rod can be placed during mounting. The guiding rod is placed inside the coil spring and prohibits the coil spring from any sideward bending when being compressed. The other end of the coil spring 44 acts on the back side of the stator 30.

In the present embodiment, by providing two part forces at either side of the centre of the stator, rotational torques in the $R_Y$ direction will develop. Such rotational torques may be introduced by angular alignment errors, c.f. e.g. FIG. 2D, discussed more in detail here below. In most application, it is still preferable to provide two equal springs at the same distances to the centre, i.e. typically the symmetry plane 26, to generate sufficient force to the stator. In such a configuration, the restoring forces for counteracting any rotation will be independent on rotation direction and the application of the normal force itself will not give any rotational component.

If possible, the normal force should be applied at or symmetrically to the centre of the stator, e.g. one spring at the symmetry plane 26. However, in some particular applications, it can be of benefit to apply two or more springs at different distances to the centre of the stator 30.

Figure 7:
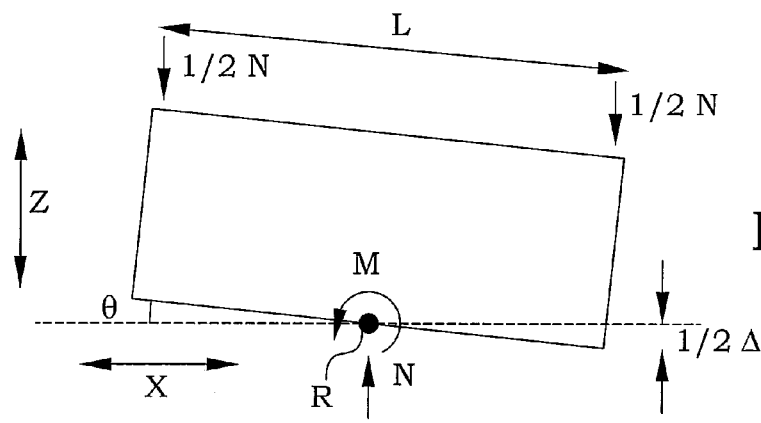
FIG. 7 is a schematic illustration of connections between normal forces and torsion.

For achieving a reliable operation, a preferred embodiment comprises a spring arrangement that provides a sufficiently low torsional flexibility. In the present disclosure, torsional flexibility is defined as the resistance against rotation, expressed as the generated rotating momentum per angle unit. FIG. 7 illustrates the connections between normal force N and torsional flexibility. Assume that half the normal force N is applied at two points separated by a distance L and symmetrically with respect to the point of rotation R. The body is rotated an angle θ, which causes the ends of the body to move a distance ½Δ up and down, respectively, with respect to the original plane. The normal force applied by springs, each with a spring constant of k/2, at the two points will then give rise to a torque M, trying to restore the rotation:

$$M = \frac{1}{2}\left(F_0 + \frac{1}{2}k \cdot \frac{1}{2}\Delta\right) \cdot \frac{L}{2} - \frac{1}{2}\left(F_0 + \frac{1}{2}k \cdot \left(-\frac{1}{2}\Delta\right)\right) \cdot \frac{L}{2} = \frac{1}{4}k\Delta \cdot \frac{L}{2}$$

where $F_0$ is the normal force without rotation. For small angles, Δ can be expressed in terms of the rotation angle θ, giving:

$$M = \frac{1}{8}k\theta L^2$$

Torsional flexibility is defined as M/θ, and if l is defined as the distance in X direction between the rotational point and the position where the normal force is applied, i.e.

$$l = \frac{L}{2},$$

a preferred torsional flexibility can be expressed as:

$$M/\theta < 0.05 \frac{F_N}{2\Delta} \cdot l^2.$$

In words, it means that the torsional flexibility preferably should be less than 5% of the ratio between the normal force N and the average double height uncertainty $\Delta$ of the surface of the body to be moved times the square of the torque arm of the applied force. This torsional flexibility is sufficient for most applications. The torque arm is typically the distance in the X direction between a symmetry point of the stator and the point at which (half) the normal force is applied. In an even more preferred embodiment, in particular for applications having very high demands on reproducibility, the torsional flexibility should be less than 1% of the same quantity.

As noted in connection with FIGS. 2A-E, a connection between the stator 30 and the stator support 35 should be quite stiff in the X-direction. In the embodiment of FIGS. 3A-C, this is, as briefly mentioned above, provided by the lateral fixing plate 46. In this embodiment, the lateral fixing plate 46 is provided parallel to the surface 5 of the body 10 to be moved. The lateral fixing plate 46 comprises here a central rectangular portion 47 provided with a rectangular hole 48, through which the electromechanical actuators 20 protrudes. The central rectangular portion 47 is rigidly attached to the stator 30, e.g. by means of screws. The lateral fixing plate 46 further comprise a respective end attachment portion 49 at the ends of the lateral fixing plate 46 in the X-direction. The end attachment portions 49 are rigidly attached to the stator support 35, e.g. by means of screws. The central rectangular portion 47 and the end attachment portions 49 are connected with a respective bridge portion 45. The bridge portions 45 are in this embodiment narrower in the Y direction than the rest of the lateral fixing plate 46, but wide enough to provide a relatively stiff connection in the X direction. The narrow bridge portions 45 increase the possibilities to allow the stator to rotate slightly in the $R_X$ direction without essentially influencing the normal force or the force in the X direction. The lateral fixing plate could also be a single or parallel cantilever structure if the design is made with the demands on torsional flexibility in mind.

The combination of the coil springs 44 and the lateral fixing plate 46 provides in this embodiment a normal force in the Z direction with a low spring constant at the same time as the spring constant in the X direction is very high, i.e. the arrangement is quite stiff in the X-direction. Furthermore, minor rotations in the $R_Y$ are allowed. Also by the narrow bridge portions 45, small rotations in the $R_X$ direction are also allowed.

In the FIGS. 3A-C, it is not explicitly shown how the stator support 35 is held against the body to be moved. In general the normal force has to find a counterhold against the body to be moved, while the motion in the main motion direction should be as unrestricted as possible. There are several solutions, as such known in prior art, to this requirement. In FIG. 4A, one solution is sketched. The stator 30 is pressed away from the stator support 35 towards the surface 5 of the body 10 to be moved. The stator support 35 extends to the other side of the body 10 to be moved, and contacts the body 10 from a side 6 opposite to the contacting surface 5 with a means 7 relatively rigid in the Z direction but which allows relative motion in the X direction. The means 7 is here illustrated as a wheel, but may be configured in many different ways, e.g. utilizing different types of sliding and/or rolling contacts. Another example is illustrated in FIG. 4B. Here, a twin-type of motor is illustrated. Two stators 30 are pressed against the body 10 to be moved from opposite directions. The stator support 35 extends around the backs of the stators 30 to support them. The force from one of the stators thereby acts as counterholding force to the normal force of the opposite stator. As anyone skilled in the art realizes, there are many prior art solutions of arranging for a counterhold that may be used in combination with the present invention.

Figure 5:
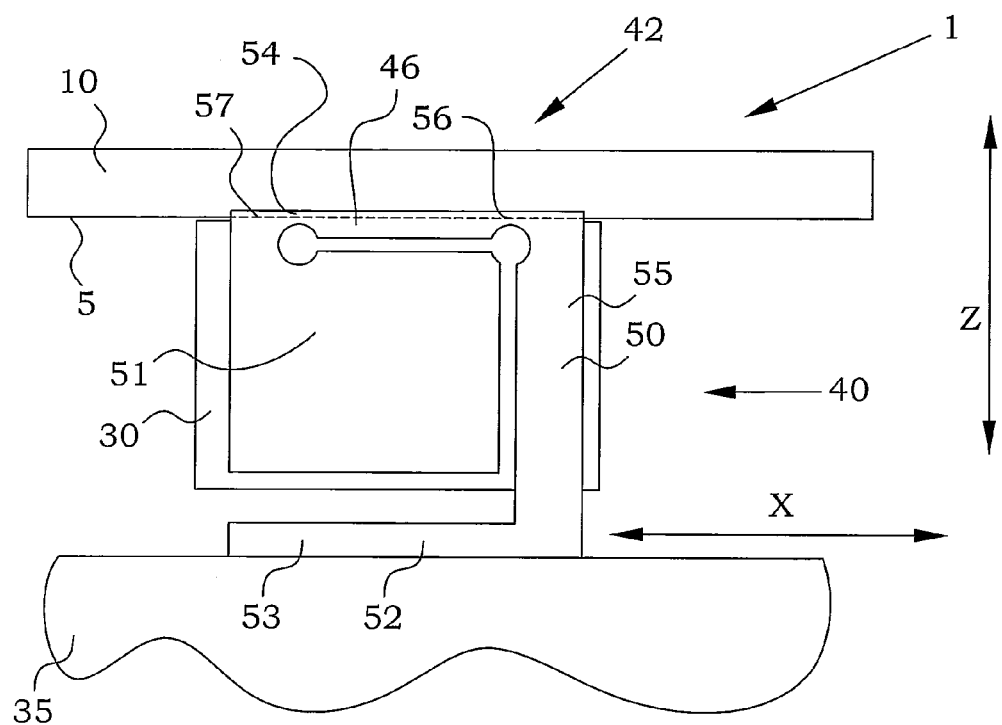
FIG. 5 is a view of another embodiment of an electromechanical motor assembly according to the present invention.

FIG. 5 illustrates another embodiment of an electromechanical motor assembly 1 according to the present invention in a side view. The side view is taken in a cross-section through the stator support 35. The force applying arrangement 40 here comprises two plate structures 50 on each side of the stator 30. Only one of the plate structures 50 is seen in the figure. The plate structures 50 consist of a respective thin plate attached at opposite sides, in a direction perpendicular to the lateral fixing plates, of the stator 30. The plates are thus perpendicular to the surface 5 of the body 10 to be moved. This gives a flexibility in the direction perpendicular to the illustrated plane, i.e. in the Y direction. As will be described further below, a relative high rigidity is provided in the X direction, since it coincides with the plate plane. As also will be discussed further below, the rigidity in the Z direction is lowered on purpose to give an action of a soft resilient member. An inner section 51 of the plate structures 50 is firmly attached to the stator 30, e.g. by means of screws. An outer attachment section 52 of the plate structures 50, in this embodiment in the form of an angle bracket 53 is firmly attached to the stator support 35. A lateral fixing plate 46 and a link portion 55 of the plate structures 50 mechanically connect the inner section 51 and the outer attachment section 52. The lateral fixing plate 46 and the link portion 55 are not directly fastened to the stator 30 but are instead attached to the stator 30 via the inner section 51.

The dimensions of the plate structure 50 in the X direction are generally relative broad, which means that the material rigidity e.g. of the lateral fixing plate 46 in a direction parallel to the plate plane is preserved. The same action as in FIGS. 3A-C is thus achieved. The centre of a joint 54 between the lateral fixing plate 46 and the inner section 51 is illustrated in the figure as a broken line 57, and defines the position in Z direction, where any forces in the X direction are applied on the stator 30. This centre line is preferably provided juxtaposed to, but not in physical contact with, the surface 5 of the body 10 to be moved. In this embodiment, the lateral fixing plate 46 is juxtaposed to the surface 5 in a sideward direction, i.e. in the Y direction (c.f. FIG. 1).

In the present embodiment, the spring arrangement 42 is integrated with the two lateral fixing plates. The lateral fixing plate 46 is connected between the link portion 55 and the inner section 51 by means of two bendable joints 54, 56, provided as narrow sections of the plate structure 50. By designing these bendable joints 54, 56 with appropriate dimensions, their spring action in the Z direction can be adapted, e.g. the spring constant. According to the present invention, the spring constant in the direction Z normal to the surface 5 of said body 10 to be moved is made lower than 5% of the ratio between the normal force and the average height uncertainty of the surface 5 of said body 10 to be moved. The lateral fixing plate 46 and the link portion 55 may therefore move slightly in the X and Z directions relative to the stator 30, as much as the bendable joints 54, 56 admit. By mounting the plate structure 50 with a certain preload in the Z direction, the requested normal force is obtained. The dimensions of the plate structure 50 are important for the operation of the spring action and preferably the plate structure 5*o* is manufactured by arc spark erosion.

Figure 6:
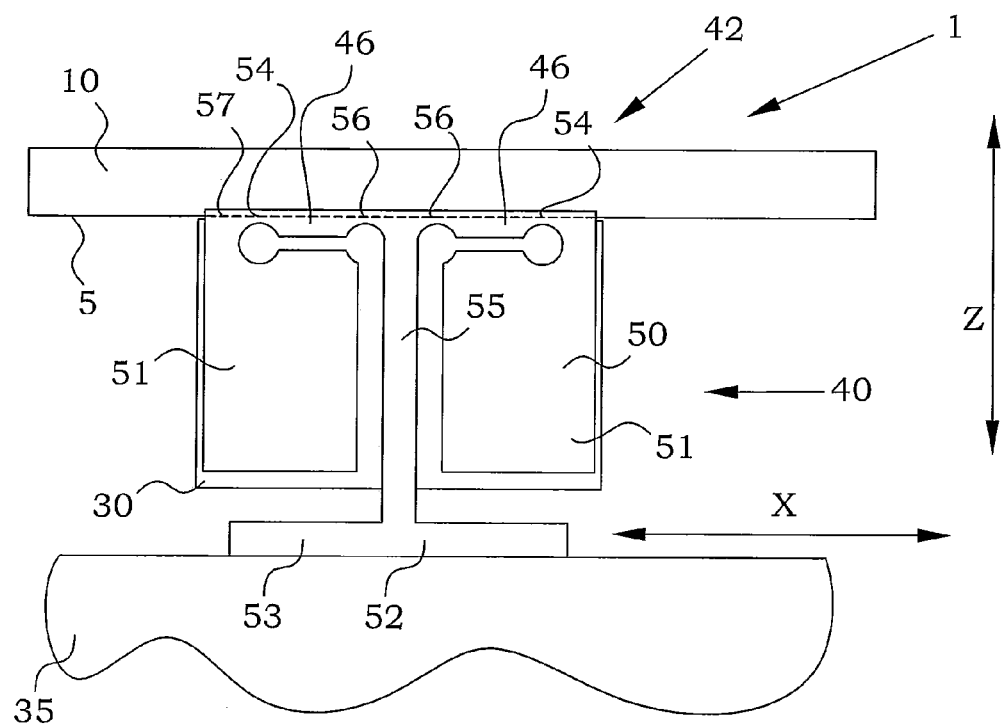
FIG. 6 is a view of yet another embodiment of an electromechanical motor assembly according to the present invention.

FIG. 6 illustrates yet another embodiment of an electromechanical motor assembly 1 according to the present invention in a side view. This embodiment has many resemblances to the embodiment of FIG. 5, however, the actual design of the plate structure 50 is somewhat different. Here, two inner sections 51 are provided as attachment to the stator 30. The lateral fixing plate 46 extends along the entire plate structure 50 in the X direction, but is here attached to the link portion 55 at a position in the X direction between the inner sections 51. The lateral fixing plates 46 and the link portion 55 are not directly fastened to the stator 30 but are instead attached to the stator 30 via the inner sections 51. This arrangement gives a somewhat more symmetric application of forces to the stator 30, but is also somewhat more complicated to manufacture and mount.

Figure 8:
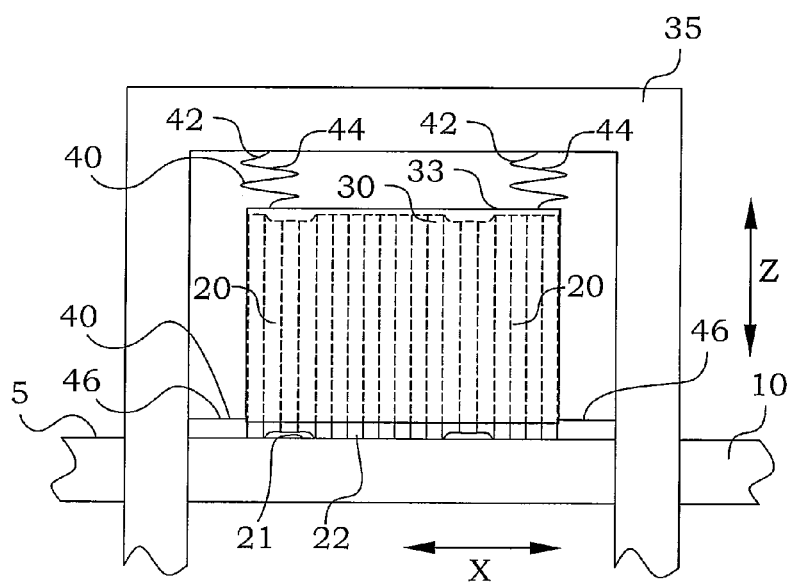
FIG. 8 is a schematic view of an embodiment of an electromechanical motor assembly according to the present invention based on peristaltic motion.

As mentioned further above, also other motion mechanisms can be used, which also move the body to be moved by repetition of steps of electromechanical actuators, where at least one of the contact portions of the electromechanical actuators is in physical non-sliding contact with the body to be moved at every time. One such example is a peristaltic motion mechanism. A background description of a possible peristaltic motor can be found e.g. in the U.S. Pat. No. 7,161, 278. Such a motor may also benefit from the present force application ideas, as illustrated by FIG. 8.

The stator 30 has a number of electromechanical actuators 20 having contact portions 22 interacting with the surface 5 of the body to be moved 10. The electromechanical actuators 20 are sequentially excited to change their length (in the Z direction) and width (in the X direction). The electromechanical actuators 20 are in this embodiment integrated into one body along essentially their entire length, which means that at least any change in width will influence the relative position of the other electromechanical actuator 20 relative the body 10. Due to the sequential width change, the stator 30 will perform stepwise movements with respect to the body 10.

The details of the actual peristaltic motion are not of particular importance for achieving the effect of the present invention and are therefore not described in detail. It is only necessary to realize that the motion is cased by repetition of steps of electromechanical actuators 20, where at least one of the contact portions 22 of the electromechanical actuators 20 is in physical non-sliding contact with the body 10 to be moved at every time. For anyone wanting a background review of this motion type, references are made to e.g. the U.S. Pat. No. 7,161,278.

The stator 30 has in this embodiment a metal shell 33, firmly attached to the actual electromechanical actuators 20 at a defined position in the X-direction. A force applying arrangement 40, in this embodiment constituted by a spring arrangement 42 of two coil springs 44 and a lateral fixing plate 46. The coil springs 44 provide the force between the shell 33 of the stator 30 and said stator support 35 in a direction Z normal to the surface 5 of the body 10 to be moved. The lateral fixing plate 46 is attached between the shell 33 of the stator 30 and the stator support 35 parallel to the main motion direction X and juxtaposed to, but not in physical contact with, the surface 5 of said body 10 to be moved.

The selection of the spring constants is made according to the discussions presented further above.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

The invention claimed is:

1. An electromechanical motor assembly, comprising:
a stator;
a body to be moved relative said stator in a main motion direction;
a stator support;
said stator having a plurality of electromechanical actuators, each electromechanical actuator having a contact portion for interaction with a surface of said body to be moved;
said plurality of electromechanical actuators being arranged to move said body to be moved by repetition of steps of said electromechanical actuators;
said plurality of electromechanical actuators being arranged to ensure that at least one of said contact portions is in physical non-sliding contact with said body to be moved at every time;
a force applying arrangement for supplying a normal force between said stator and said stator support;
said force applying arrangement comprising at least one spring arrangement arranged for providing a force between said stator and said stator support in a direction normal to said surface of said body to be moved,
said force applying arrangement further comprises:
a lateral fixing plate attached between said stator and said stator support parallel to said main motion direction and juxtaposed to, but not in physical contact with, said surface of said body to be moved;
said spring arrangement having a low spring constant in said direction normal to said surface of said body to be moved;
said spring constant is lower than 5% of the ratio between said normal force and the average height uncertainty of said surface of said body to be moved.

2. The electromechanical motor according to claim 1, wherein said spring constant is lower than 1% of the ratio between said normal force and the average height uncertainty of said surface of said body to be moved.

3. The electromechanical motor according to claim 1, wherein a torsional flexibility of said spring arrangement is lower than 5% of the ratio between said normal force and the average height uncertainty of said surface of said body to be moved times the square of a distance in said main motion direction between a symmetry point of said stator and a point at which at least a part of said normal force is applied.

4. The electromechanical motor according to claim 3, wherein said torsional flexibility of said spring arrangement is lower than 1% of the ratio between said normal force and the average height uncertainty of said surface of said body to be moved times the square of said distance in said main motion direction between said symmetry point of said stator and said point at which at least said part of said normal force is applied.

5. The electromechanical motor according to claim 1, wherein said spring arrangement being arranged to provide said normal force symmetrically with respect to a symmetry plane perpendicular to said main motion direction and passing through a symmetry point of said stator.

6. The electromechanical motor according to claim 5, wherein said spring arrangement comprises two coil springs applied between said stator and said stator support on each side of said symmetry plane.

7. The electromechanical motor according to claim 1, wherein said lateral fixing plate is provided parallel to said surface of said body to be moved.

8. The electromechanical motor according to claim 1, further comprising two said lateral fixing plates provided perpendicular to said surface of said body to be moved on each side, in a direction perpendicular to said lateral fixing plates, of the stator.

9. The electromechanical motor according to claim 8, wherein said spring arrangement being integrated with said two lateral fixing plates.

10. The electromechanical motor according to claim 2, wherein a torsional flexibility of said spring arrangement is lower than 5% of the ratio between said normal force and the average height uncertainty of said surface of said body to be moved times the square of a distance in said main motion direction between a symmetry point of said stator and a point at which at least a part of said normal force is applied.

11. The electromechanical motor according to claim 10, wherein said torsional flexibility of said spring arrangement is lower than 1% of the ratio between said normal force and the average height uncertainty of said surface of said body to be moved times the square of said distance in said main motion direction between said symmetry point of said stator and said point at which at least said part of said normal force is applied.

12. The electromechanical motor according to claim 2, wherein said spring arrangement being arranged to provide said normal force symmetrically with respect to a symmetry plane perpendicular to said main motion direction and passing through a symmetry point of said stator.

13. The electromechanical motor according to claim 3, wherein said spring arrangement being arranged to provide said normal force symmetrically with respect to a symmetry plane perpendicular to said main motion direction and passing through a symmetry point of said stator.

14. The electromechanical motor according to claim 4, wherein said spring arrangement being arranged to provide said normal force symmetrically with respect to a symmetry plane perpendicular to said main motion direction and passing through a symmetry point of said stator.

15. The electromechanical motor according to claim 10, wherein said spring arrangement being arranged to provide said normal force symmetrically with respect to a symmetry plane perpendicular to said main motion direction and passing through a symmetry point of said stator.

16. The electromechanical motor according to claim 11, wherein said spring arrangement being arranged to provide said normal force symmetrically with respect to a symmetry plane perpendicular to said main motion direction and passing through a symmetry point of said stator.

17. The electromechanical motor according to claim 12, wherein said spring arrangement comprises two coil springs applied between said stator and said stator support on each side of said symmetry plane.

18. The electromechanical motor according to claim 13, wherein said spring arrangement comprises two coil springs applied between said stator and said stator support on each side of said symmetry plane.

19. The electromechanical motor according to claim 14, wherein said spring arrangement comprises two coil springs applied between said stator and said stator support on each side of said symmetry plane.

20. The electromechanical motor according to claim 15, wherein said spring arrangement comprises two coil springs applied between said stator and said stator support on each side of said symmetry plane.

* * * * *